Patented June 12, 1934

1,962,686

UNITED STATES PATENT OFFICE 1,962,686

PARTING COMPOUND

Louis H. Heyl, Lakewood, Ohio, assignor to The Federal Foundry Supply Company, Cuyahoga Heights Village, Ohio, a corporation of Ohio No Drawing. Application December 12, 1933, Serial No. 702,095

9 Claims. (Cl. 22—163.5)

This invention relates to a parting compound for use in making molds and, more particularly, to a parting compound of improved characteristics which is also not injurious to the health of workmen.

In foundry practice, as is well known, a parting sand is spread between the meeting surfaces of the mold sections in order to insure ready separation of the surfaces when the mold is drawn. This parting compound or sand usually consists of siliceous material, namely, finely divided tripoli, which is decomposed silica rock containing over 99% pure free silica. This material, when dusted on the mold, floats in the air and is inhaled by the workmen in the foundry so that the finely divided sharp silica grains settle in the lungs and cause a disease commonly known as "silicosis". It has now been found that this siliceous material may be replaced by phosphate rock which does not produce silicosis because the phosphate rock itself, when in fine grains, is not so sharp and harsh as silica, and the comparatively small percentage of silica present therein is combined in the form of silicates with other constituents of the rock. Such combined silica is eventually soluble in the fluids of the body and, consequently, does not remain, like free silica, as more or less permanent sharp-edged particles which can cut the lung tissues and produce inflammation.

In addition to its safeness from the point of view of health, phosphate rock has certain properties which make it very desirable for use in parting compounds, one of these being the porous structure of the rock which causes it to take up and retain in a more effective manner the water-proofing or water-repellent compounds which may be added to the finely divided material. These waterproofing agents are added for the purpose of maintaining the parting compound in dry form so that it will constitute a line of parting between the damp sand faces of the mold sections, and so that it will remain in free flowing condition suitable for being dusted on such mold faces. Stearic acid is one of the materials which may be used for this purpose. Where finely divided phosphate rock is used, the porous structure of the rock renders it possible, not only to coat the particles, but also to impregnate the same with the stearic acid or other water repelling agents. In this way, the water-proofing is made much more effective and permanent since the whole particle is saturated with the agent and not merely coated therewith.

A further advantage of the use of phosphate rock as a parting compound is it non-slag forming character under the conditions of heat encountered in sand molds. Such slagging is objectionable since it may result in imperfections in the casting and it is found that the use of phosphate rock in the parting compound avoids this difficulty.

It is, accordingly, an object of the invention to provide an improved parting compound which is non-poisonous to workmen and has superior water repellent characteristics. Another object of the invention is to provide a parting compound characterized by the use of finely divided phosphate rock and having a porous structure capable of absorbing oily or greasy materials. Various other objects will in part be obvious and will in part appear hereinafter.

Various phosphate rocks may be used, all of these containing a considerable percentage of calcium phosphate and hence being referred to hereafter and in the claims as calcium phosphate rocks. Preferably, these rocks contain as low a percentage of silica as possible. The silica is in the combined form as silicates of calcium, aluminum, iron, or combinations of these, naturally occuring in the rock and, as a result, is eventually soluble in the body and does not produce silicosis. A typical analysis of a suitable rock is the following:

| | |
|---|---|
| $Ca_3(PO_4)_2$ | 87.70 |
| $Al_2O_3$ | 5.76 |
| $Fe_2O_3$ | 3.01 |
| $SiO_2$ | 3.38 |

However, it will be realized that any phosphate rock may be used which can be pulverized into particles having the described porous structure and which has little or no free silica. For example, phosphate rocks exist which, unlike the analysis given above, contain no iron but these are also suitable for use.

The invention also includes mixtures of any suitable calcium phosphate rock or calcium phosphate with varying proportions of calcium carbonate or limestone, the purpose of the calcium carbonate being to reduce the ultimate proportion of combined silica present in the mass and also to reduce the density of the parting compound as expressed in grams per cubic inch. Thus, a mixture suitable for the preparation of a parting compound may be made up in the proportions of 87½ pounds of calcium phosphate rock and 12½ pounds of calcium carbonate. Such a mixture waterproofed with 2 pounds of stearic acid or other water repelling agent weighs 12.97 grams per cubic inch, whereas the phosphate rock alone, when pulverized in the same degree, namely, so that 95% will pass through a 200 mesh screen, and waterproofed, weighs 14.17 grams per cubic inch. The density of the parting compound can thus be varied within certain limits, it being found useful to add calcium carbonate for this purpose in amount from 12½% to 49% of the untreated mixture.

These densities are greater than that of tripoli which, when waterproofed and ground to the same degree of fineness, has a density of 10.2 grams per cubic inch. Thus, when the phosphate parting compound of the present invention is ground to the same degree of fineness as tripoli, it is heavier and more of it will settle on the sand surfaces of the mold sections with less floating off into the air to get into the lungs of workmen. As a result, not only is the workman's health protected but less parting compound is needed per mold since more of that which is applied, settles on the surfaces of the mold. A further economy in this regard can be effected by providing finer mesh bags for shaking the compound onto the mold due to the fact that the heavier particles of the new parting compound will sift through given meshes more readily. In practice it is found that an 80 mesh bag may be used for dusting the new compound in place of the 40 to 60 mesh bag supplied for use with the tripoli compounds now commonly used. Actually, less of the powder will pass through the finer mesh during the number of shakes which the foundryman gives to the bag, but this is sufficient, due to the fact that the heavier particles of the phosphate parting compound settle to a greater extent on the sand surfaces and less floats off into the air.

The waterproofing agent may be stearic acid, as mentioned above, or any other well known waterproofing agent, such as the various animal, mineral and vegetable oils, any of these being applied to the pulverized phosphate rock or mixtures of phosphate rock and calcium carbonate.

Such a waterproofed parting compound prepared from phosphate rock also possesses the property of readily letting water through to the sand beneath the surface where it is applied, such property being important where it is desired to swab around loose patterns to facilitate a perfect draw of the pattern or to patch up a broken edge of the sand mold occurring when the pattern is drawn. These broken edges are patched by wetting the mold around the broken place and then applying more sand which is held in place by the wetted surface. If the parting compound is of a nature, the grains of which are not porous, but rather solid, it is difficult to wet or swab the desired place, but no such difficulty occurs when the present compound is used since it readily permits the water to pass through the pores in the grains and on into the sand in the mold.

One method by which the new parting compound may be prepared is the following, although it will be understood that this is intended by way of illustration only and that various modifications of the method may also be employed:

The calcium phosphate rock as it comes from the mine is dried and pulverized to varying degrees of fineness, ranging from a fineness corresponding to the condition where 95% of the particles will pass through a 140 mesh screen to a fineness corresponding to the condition where 97% of the particles will pass through a 325 mesh screen. After this material has been dried and ground, it is placed in a jacketed mixer of any suitable type with revolving paddles to keep the material agitated. The jacket, which entirely surrounds the mixer, is air or water tight and is filled, for example, with a suitable heating fluid which is kept circulating. The jacket heats the phosphate rock particles in the mixer to approximately 375° F. Of course, it is also possible to apply direct heat to the mixer to heat the particles to the same temperature.

The materials may be placed in the mixer in the proportions represented by quantities of 100 pounds of dried and pulverized calcium phosphate rock and 2 pounds of triple-pressed stearic acid, the phosphate rock being first thoroughly dried and heated during a period of 15 to 20 minutes in the mixer and the stearic acid then added. The melted stearic acid mixes with the hot, dry phosphate rock particles and not only coats them with a waterproofing coating but also penetrates into the pores of the finely divided grains and impregnates the entire grain with the waterproofing substance. This effects a distinct advantage because of the customary way in which parting materials are applied to the pattern or mold in foundry practice, namely, by dusting through a shake bag. Non-porous parting materials can merely be coated with the waterproofing or water repelling agents. When shaken in a dust bag, the non-porous grains rub against each other which action wears the waterproofing material off the grain surfaces, impairing the quality and rendering the compound unsuitable for use as a parting material. The porous grains of the calcium phosphate rock used in this new improved compound, however, remain permanently waterproof because of the fact that each grain is impregnated with the water repelling materials and the rubbing or abrasive action of one grain against the other in shaking the dust bag does not impair the waterproof nature of the new improved compound. The coating and impregnating of the particles with the stearic acid is usually completed in from one hour to one and one-half hours.

Where calcium carbonate is included in the mixture, it is placed in the mixer and treated in the same manner as outlined above, the calcium carbonate replacing a portion of the phosphate rock and the stearic acid or other water-repellent material coating the mixed particles in the same manner.

The new parting compound is thus characterized by the use of calcium phosphate rock, which is capable of being much more effectively waterproofed, due to its porous structure, is non-slag forming, and is not poisonous to the workmen since it can be broken down into particles which are not sharp and harsh and there is present no free silica in the form of sharp particles which may be inhaled and cause silicosis.

What I claim is:

1. A parting compound consisting of finely divided phosphate rock containing an appreciable quantity of calcium, the particles of which rock have been treated with a water repellent material.

2. A non-slag forming parting compound consisting of finely divided phosphate rock containing an appreciable quantity of calcium, the particles of which rock have been coated and impregnated with a greasy material.

3. A parting compound for use in molding, consisting of finely divided calcium phosphate rock of a fineness in the range between the condition where about 95% of the particles will pass a 140 mesh screen and the condition where more than 95% of the particles will pass a 325 mesh screen, and a water-repellent material on said particles.

4. As a parting compound, a finely divided calcium-containing phosphate rock having a low combined silica content and the particles of which have been treated with a water-repellent material.

5. A parting compound comprising finely divided phosphate rock containing an appreciable quantity of calcium, the grains of which rock are porous and have been coated and impregnated with a waterproofing agent, the pores of each grain being so impregnated with said agent that rubbing and abrading of one grain against another does not impair the permanence of such waterproofing.

6. A parting compound consisting of finely divided phosphate rock containing an appreciable quantity of calcium, the particles of which rock have been coated and impregnated with stearic acid.

7. A parting compound comprising a mixture of calcium phosphate rock and calcium carbonate in finely divided condition and a water repellent material.

8. A parting compound consisting of a finely divided mixture containing from about 87½% to 51% of calcium phosphate rock and from about 12½% to 49% of calcium carbonate to which mixture a water-repellent material is added.

9. A parting compound consisting of calcium phosphate rock, calcium carbonate and triple-pressed stearic acid in the approximate proportions of 87½ pounds of phosphate rock, 12½ pounds of calcium carbonate and 2 pounds of stearic acid.

LOUIS H. HEYL.